Figure 1:
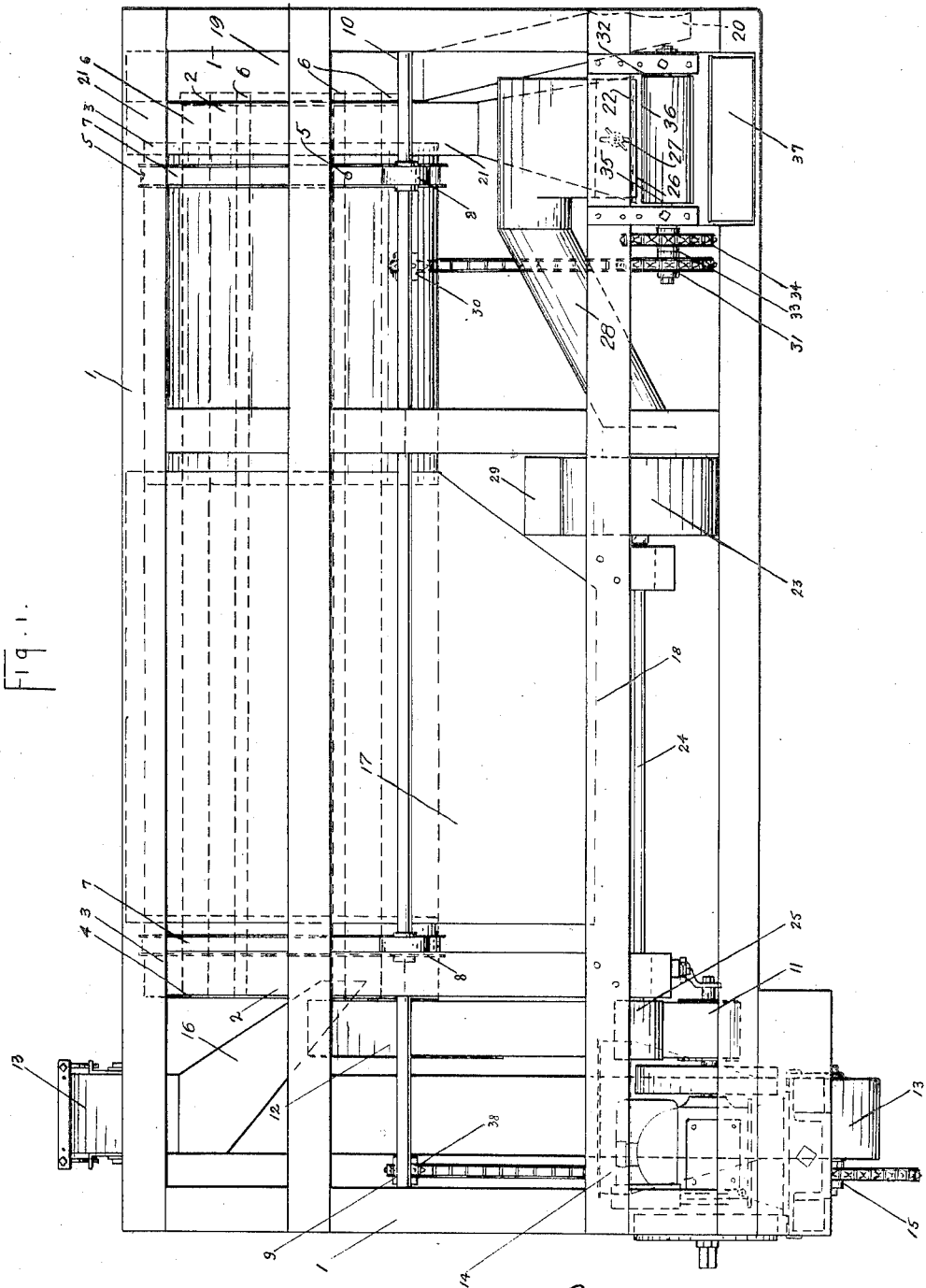

March 20, 1934.    R. E. McDONALD ET AL    1,951,735
MACHINE FOR SCREENING GIN TRASH
Filed Feb. 24, 1932    3 Sheets-Sheet 1

Robert E. McDonald
Gustav J. Scholl
Inventor

By
Attorney

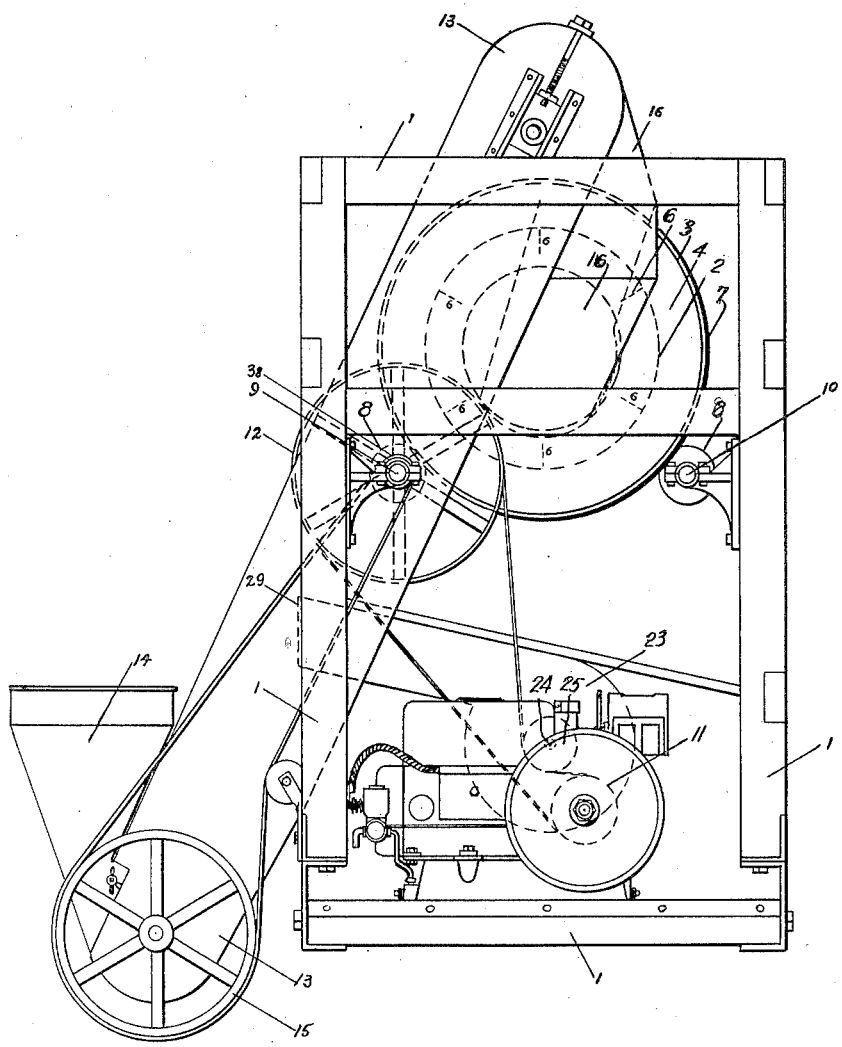

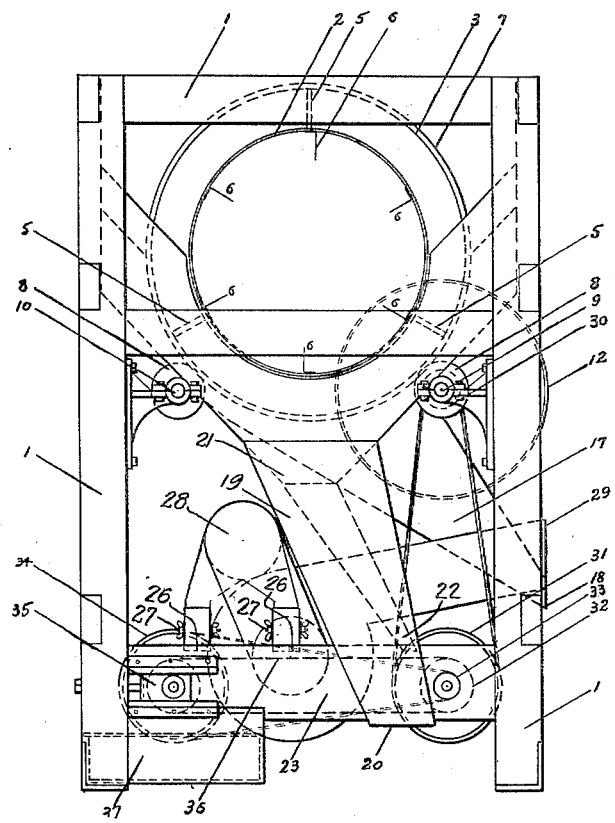

UNITED STATES PATENT OFFICE 1,951,735

MACHINE FOR SCREENING GIN TRASH

Robert E. McDonald and Gustav J. Scholl, San Antonio, Tex., dedicated to the free use of the public Application February 24, 1932, Serial No. 594,934

1 Claim. (Cl. 209—291)

(Granted under the act of March 3, 1883, as amended April 30, 1928; 370 O. G. 757)

This application is made under the act approved March 3, 1883, as amended by the act of April 30, 1928, and the invention herein described may be manufactured and used by or for the Government for governmental purposes without the payment to us of any royalty thereon.

We hereby dedicate the invention herein described to the free use of the public, to take effect upon the granting of a patent to us.

Gin trash is substances of various sizes and weights, such as pieces or parts of the cotton bur or plant, leaves, dirt and other débris, which adhere to cotton when it is being harvested in the fields. These substances are separated from the cotton in the processes of ginning and are discharged en masse as waste, that amounts to from a peck to several bushels per bale, depending on character of soil, weather conditions and the advance of the crop. It is in this material that the pink bollworm, a cotton insect, is most likely to be found when an infestation exists.

Heretofore in the examination of gin trash to determine whether infestation of the pink bollworm existed in the community under consideration, it was necessary for the inspector to look through the entire mass of débris, which required considerable time and tedious care to accomplish. With the use of our machine hereinafter described, this conglomerate mass of trash is segregated into integral parts; namely, large, medium, and small, and heavier and lighter substances. In this mechanical separation, all pink bollworms are retained in the medium sized trash of equal size and weight of this insect, and the heavier, larger, smaller, and lighter substances are discharged and eliminated from further inspection. The residue containing the pink bollworm is a very small part of the quantity of material introduced into the machine, but the general average will be about $\frac{1}{32}$ of the original volume. Therefore, one man with our apparatus can do the work of 32 men without it, but on account of the clean condition of the residual material to be examined, the efficiency of the man with the use of a machine is increased more than thirty-two fold.

Our invention can be performed by a machine which consists essentially of two drums, one within the other, both made of screen wire and made together so that they revolve in unison, and a vacuum separator with double suction.

We attain the objects of our invention by the mechanism illustrated in the accompanying drawings in which Figure 1 is a side view of the apparatus, and Figures 2 and 3 end views.

Similar numerals refer to similar parts throughout the several views.

The method of operation is that the material to be examined is introduced into hopper 14 attached to lower end of elevator 13, which is attached to frame 1 by suitable means (not shown) and is carried by elevator buckets attached on link-belt chain (not shown) driven by sprocket 15 with link-belt chain from drive sprocket 38 attached to countershaft 9, to the higher end where it is dumped into chute 16 through which it is discharged into inner drum 2 through an opening approximately twelve inches in diameter in sheet metal disc 4 at head end of drums. The material is then picked up from the bottom of inner drum 2 by flanges 6, carried to the top and dropped back to the bottom of the drum in order to bring about a better separation.

The two drums 2 and 3 are made together by means of a sheet metal disc 4 at head end of drums, and by pipe spreaders and bolts 5 at exit end of drums. Outer drum 3 has affixed two flanged bands 7 near each end which bands rest on rollers 8 affixed to countershaft 9 and idler shaft 10, which are at a slight angle. These drums revolve in unison. Inner drum 2 is made of screen six mesh to one inch, and outer drum 3 is made of screen fourteen mesh to one inch.

Inner drum 2 is for the purpose of withholding those substances larger than is desired to recover, thus discharging them through chute 19 at exit 20. Outer drum 3 is for the purpose of passing through substances smaller than is desired to be recovered; thus the substance desired to be recovered, namely, the pink bollworms, will be held and moved forward between inner drum 2 and outer drum 3 and discharged through chute 21 at exit 22, onto continuous conveyor belt 36, driven by pulley 35 over idle pulley 32. Continuous conveyor pulley 35 is driven by sprocket 34 with link-belt chain over sprocket 33 affixed to floating shaft of idle continuous conveyor pulley 32, sprocket 31 is also affixed to floating shaft of idle continuous conveyor pulley 32 and is driven by link-belt chain over sprocket 30 affixed to counter shaft 9.

In this process those substances which are about the same size or smaller than the pink bollworm, including pink bollworm, pass through the meshes of the screen of inner drum 2, and as the machinery revolves by means of suitable power transmitted over continuous belt 11 onto pulley 12 affixed to countershaft 9 to which are attached friction rollers 8—8, which drive drums on outer surface of continuous flanged bands 7—7, fastened near each end of outer drum 3, those substances which are not larger than the pink bollworm, including pink bollworms, are deposited in the space between the inner drum 2 and the outer 3; those substances which are smaller than the pink bollworm pass out through the finer mesh screen of the outer drum 3 and are dropped into chute 17 and discharged at exit 18; those substances of approximately the same size of the pink bollworm, including pink bollworms, are moved forward between the inner drum 2 and outer drum 3 to the end of outer drum 3 and are discharged into chute 21 at exit 22, onto continuous conveyor belt 36, and thence carried under vacuum separator arrangement of the fan at 26—26.

Fan 23 driven by continuous belt 11 over pulley 25 on fan shaft 24, lifts by vacuum suction at 26—26, which is regulated by adjustable intake by wing nuts 27—27, those substances lighter than the pink bollworm and carries same through air suction line 28 into suction fan 23 which discharges them through air exhaust arm 29. The pink bollworm and other substances of like weight are thence carried by continuous conveyor belt 36, driven by continuous conveyor belt pulley 35 over idle continuous conveyor belt pulley 32, to receptacle at 37, from which the pink bollworms are easily detected and extracted by the inspector.

The purpose of fan 23 is to give, by vacuum separation, the substance a further cleaning so that the insects may be discovered with less difficulty.

We claim:

In a gin trash detector, the combination of a feeding hopper with a frame, having mounted therein a charging conveyor, communicating with said hopper; means therein for driving said charging conveyor; a charging chute mounted in said frame; said conveyor associated with said chute; dual concentric hollow screening drums mounted in said frame, the innermost drum having mesh larger than the outermost drum; said charging chute disposed towards said innermost screening drum; means for imparting concentric rotation to said screening drums; a primary discharge chute; said innermost screening drum internally disposed towards said chute; a secondary discharge chute; said outermost screening drum externally disposed towards said secondary discharge chute; a tertiary discharge chute; said outermost screening drum internally disposed towards said tertiary discharge chute; a continuous discharge conveyor mounted in said frame; means therein for driving said discharge conveyor; said discharge conveyor associated with said tertiary discharge chute; a suction fan mounted in said frame; means for rotating said fan; a conduit mounted in said frame and associated with said fan; intake end of said conduit superimposed over said discharge conveyor; and a trash receptacle detachably mounted in said frame, said discharge conveyor superimposed over said receptacle.

ROBERT E. McDONALD.
GUSTAV J. SCHOLL.